Sept. 25, 1962  G. R. STEELE  3,055,462
SELF-LOCKING CONNECTION FOR STRUCTURAL MEMBERS
Filed Oct. 21, 1960  2 Sheets-Sheet 1
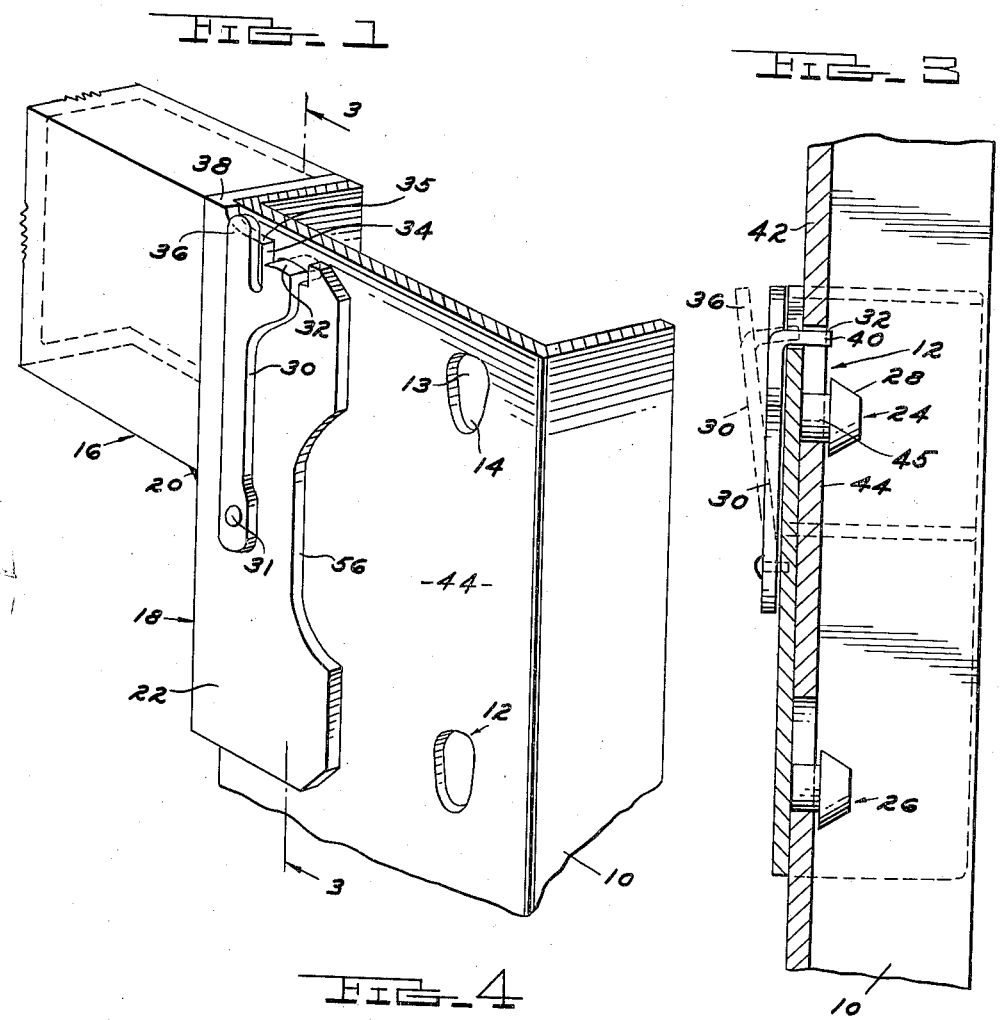
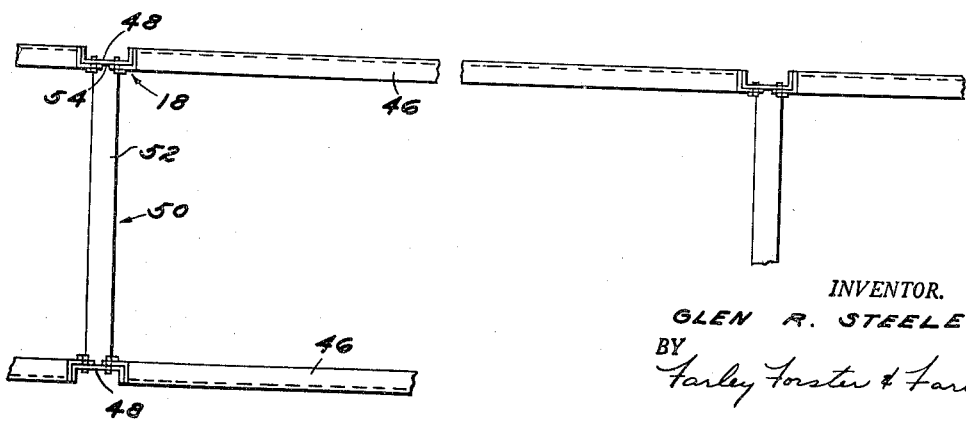
INVENTOR.
GLEN R. STEELE
BY
Farley Forster & Farley
ATTORNEYS

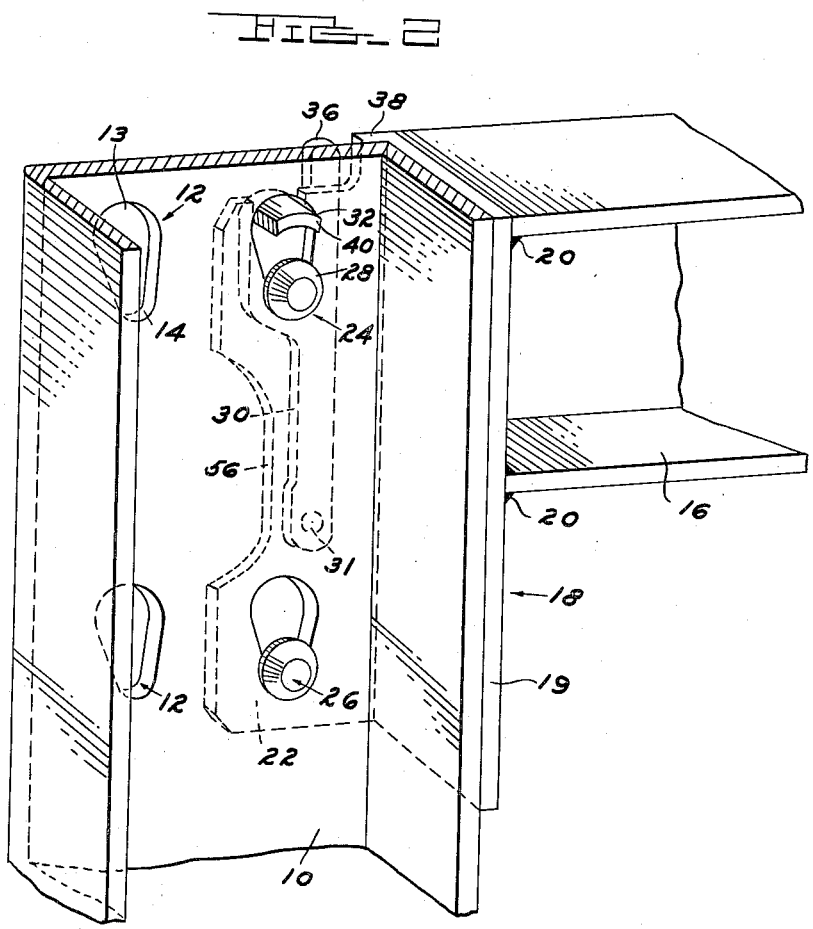

United States Patent Office 3,055,462
Patented Sept. 25, 1962

3,055,462
SELF-LOCKING CONNECTION FOR
STRUCTURAL MEMBERS
Glen R. Steele, Plymouth, Mich., assignor to Bathey Manufacturing Company, Plymouth, Mich., a corporation of Michigan
Filed Oct. 21, 1960, Ser. No. 64,080
2 Claims. (Cl. 189—36)

The present invention relates to an improved connection of the type where a pair of structural members each have connector elements which can be engaged by relative movement between the two members, the present invention providing a construction for locking the connector elements of the two members in engaged relation.

Connections of the general type, which are widely employed, depend upon gravity or a wedging action or both to retain the members in assembled relation, and usually the weight of one of the members acts in a direction such as to maintain the connector elements in an engaged condition. The present invention provides a connection wherein the ordinary retaining action is augmented by a latch, which preferably is self-engaging, and, when engaged acts to positively prevent relative movement between the two structural members in a direction and extent such as would result in a possible disengagement of their connector elements.

One use of the present invention is in the field of storage and pallet rack structures, many of which employ the type of connection under discussion. For example, the vertical members of a rack structure are frequently equipped with a slot or series of slots, and the horizontal members of the structure are equipped at their ends with connectors which can be inserted through the slot and engaged behind the slot. The handling of articles on and off these rack structures is frequently performed by forklift trucks, and with the type of connection employed, there is a constant danger that a lift truck operator, in removing a load from the rack structure, will accidentally place the forks of the truck beneath a horizontal member of the structure and cause it to be disconnected from a vertical member or pair of members when the forks are raised.

The present invention provides, in combination with two members which can be connected in assembled relation by the engagement of a projecting connector element on one member with an apertured connector element on the other member, a latch which is mounted on one of the structural members for normally urged movement to a position where at least a portion of the latch occupies that portion of the apertured connector element through which the projecting connector element is inserted, thereby preventing removal thereof. Means are provided whereby this latch is moved out of a latching position automatically during assembly of the two structural members by the relative movement therebetween, and whereby the latch can be moved manually out of a latching position in order to disassemble the two structural members.

Preferably, one of the structural members is provided with a connector plate at each of its ends with at least one projecting connector element secured thereto. The latch member is mounted adjacent the projecting connector element for normally urged movement in the general direction of initial engaging movement between the projecting connector element and the apertured element, and the latch member is spaced from the projecting connector element a distance not in excess of the distance moved by the projecting connector element into engaged relation with the apertured element. Thus, as the projecting connector element is brought into position for initial engagement with the apertured element, the latch member engages the portion of the structural member around the apertured element therein and is moved out of latching position. When the projecting connector element is then moved into overlapping relation with the apertured element, the latch element automatically snaps into position in the aperture.

A representative construction showing a presently preferred embodiment of the invention is disclosed in the accompanying drawings which consist of the following views:

FIGURE 1, a perspective elevation showing the improved connection between two structural members;

FIGURE 2, a perspective elevation showing the reverse side of the connection of FIG. 1;

FIGURE 3, a sectional elevation taken as indicated by the line 3—3 of FIG. 1.

FIGURE 4, a plan view of a structure such as a storage rack showing the structural members thereof connected in a slightly modified way.

Referring to FIGS. 1–3, a channel section structural member 10 is provided with a number of apertured connector elements in the form of keyhole type slots 12 each having an enlarged upper portion 13 and a restricted lower portion 14

A second structural member 16, of channel section, is provided at its end with an angle section end fitting 18, one flange 19 of which extends transversely to the member 16 which is welded thereto as indicated at 20, and the other flange 22 of which extends longitudinally of the member 16, projecting beyond its end.

A pair of connector elements 24 and 26 are rigidly secured to the end fitting flange 22. Each connector element 24 and 26 has a headed portion 28 tapered and dimensioned for easy insertion through the enlarged portion 13 of one of the apertures 12 and for engagement behind the restricted portion 14 thereof. In the construction shown, assembled relation between the structural members 10 and 16 results from a first horizontal inserting movement of the member 16 to place the connector elements 24 and 26 in the apertures 12 and from a second downward engaging movement to position the headed portions 28 behind the restricted portion 14 of the apertures. The general arrangement of the apertured and headed connector elements is conventional and the connection between the structural members 10 and 16 can be broken or disconnected by relatively moving them first vertically and then horizontally.

In order to lock the members 10 and 16 in assembled relation, a latch 30 is secured to the end fitting flange 22 by a rivet 31. The latch 30 is flexible and is provided with a portion 32 which extends generally parallel to the headed connector element 24, being spaced therefrom a distance not in excess of the extent of engaging movement. Portion 32, which forms the latching element, is received in a notch 34 cut in the recessed upper edge 35 of the end fitting flange 22, the notch 34 serving to confine motion of the latch element 32 to a direction substantially parallel to the length of the adjacent connector element 24. Latch 30 is also provided with a tab 36 which projects above the recessed upper edge of the end fitting flange 22, but preferably not above the top edge 38 of the end fitting.

To assemble the structural members 10 and 16, the member 16 is brought into a position where its connector elements 24 and 26 are approximately aligned with the enlarged upper portions 13 of a pair of apertures 12 in the member 10. Upon horizontal relative movement between the members 10 and 16 the connector elements 24 and 26 will guide themselves through the pair of apertures 12. At the same time, the end 40 of the latch element 32 will come into abutment with the face 42 of the member 10, causing the latch 32 to be deflected from its normal position to the position shown in dashline in FIG. 3. Subsequent vertical movement between the members 16 and 10 will result in the head 28 of each connector element 24 and 26 being placed behind the restricted portion 14 of an aperture 12 into overlapping engagement with the inner face 44 of the member 10; and, since the dimension across the latch element 32 and connector element shank 45 is less than the length of an aperture, when the shank 45 bottoms in the aperture the latch 30 will snap back to its normal position where the latch element projects into the enlarged portion 13 of the aperture 12. It is obvious that a self-locking connection between the two structural members has thus been established, and that in order to disassemble the members, the latch 30 must be manually disengaged by grasping the tab 36 and moving the latch element 32 out of the aperture 12. Manual operation of the latch 30 is only a momentary one, as it can be released as soon as the connector element 24 has been moved toward the enlarged upper portion 13 of the aperture 12 enough to overlap the end 40 of the latch with the face 42 of the member 10.

FIGURE 4 illustrates a portion of a structure, such as a pallet rack, in which horizontal supporting members 46 are each connected to the vertical members 48 of end frames 50, each frame consisting of a pair of vertical members 48 interconnected by transverse members 52. In FIG. 4, the end fittings 18 are shown engaging an inner face 54 of the upright members 48, thereby placing the connector elements inwardly of the outer sides of the structure. This is made possible by the provision of a cut-out portion 56 formed in the flange 22 of each end fitting and shown in FIGS. 1 and 2, to provide clearance between the end fittings and the cross-members 52.

While preferred embodiments have been described above in detail, it will be understood that numerous modifications might be resorted to without departing from the scope of the invention as defined in the following claims.

I claim:

1. Connecting means for securing two structural members together in assembled relation comprising
    (a) an end fitting secured to an end of one of said members,
    (b) a headed connector element projecting from one face of said end fitting,
    (c) an aperture in a surface of the other of said members said aperture having an enlarged portion through which said connector element can pass and a reduced portion behind which the headed portion of said connector element can be engaged by relative movement between said members,
    (d) a resilient latch member secured to the opposite face of said end fitting so as to be normally urged into abutment therewith,
    (e) said latch member having a latch element extending across said end fitting and normally projecting therefrom in spaced relation with said connector element by a distance not in excess of the extent of said relative engaging movement between said members,
    (f) the said surface of said other member extending from the enlarged portion of said aperture a distance in excess of said relative movement whereby engagement of said connector element in said aperture is accompanied by initial motion of said latch member to unlatched position in response to engagement of the end of said latch element with said surface as the connector element is passed through the enlarged portion of said aperture, and subsequent resiliently urged motion to latched position in which the latch element projects into the enlarged aperture portion as the connector element is placed in the reduced aperture portion, and
    (g) guide means on said end fitting for engagement by said latch element to confine movement of said latch element to a direction substantially parallel to said connector element.

2. Connecting means according to claim 1 further characterized by said latch member having a tab portion formed integrally therewith, said tab portion extending beyond an edge of said end fitting to facilitate motion of said latch member to unlatched position manually.

References Cited in the file of this patent

UNITED STATES PATENTS

| | | |
|---|---|---|
| 106,382 | Maulding et al. | Aug. 16, 1870 |
| 261,939 | May | Aug. 1, 1882 |
| 2,603,167 | Webster et al. | July 15, 1952 |